(12) United States Patent
Wiseman et al.

(10) Patent No.: US 7,526,649 B2
(45) Date of Patent: Apr. 28, 2009

(54) SESSION KEY EXCHANGE

(75) Inventors: Willard M. Wiseman, Vernonia, OR (US); David W. Grawrock, Aloha, OR (US); Ernie Brickell, Portland, OR (US); Matthew D. Wood, Hillsboro, OR (US); Joseph F. Cihula, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 10/748,773

(22) Filed: Dec. 30, 2003

(65) Prior Publication Data

US 2005/0149722 A1 Jul. 7, 2005

(51) Int. Cl.
*H04L 9/00* (2006.01)
*H04L 9/32* (2006.01)
*G06F 11/30* (2006.01)
*G06F 12/14* (2006.01)
*G06F 11/00* (2006.01)
*G06F 12/16* (2006.01)
*G06F 15/18* (2006.01)
*G08B 23/00* (2006.01)

(52) U.S. Cl. ............... 713/175; 713/155; 713/176; 713/177; 713/179; 713/180; 713/181; 713/189; 726/22; 726/25; 709/224

(58) Field of Classification Search ............... 713/155, 713/175–181, 189; 726/22, 25; 709/224
See application file for complete search history.

(56) References Cited

U.S. PATENT DOCUMENTS

| | | | |
|---|---|---|---|
| 5,713,009 A * | 1/1998 | DeRosa et al. ............... 713/2 |
| 5,867,714 A * | 2/1999 | Todd et al. ............... 717/172 |
| 6,148,401 A * | 11/2000 | Devanbu et al. ............... 713/170 |
| 7,051,211 B1 * | 5/2006 | Matyas et al. ............... 713/187 |
| 2002/0138554 A1 * | 9/2002 | Feigen et al. ............... 709/203 |
| 2004/0003288 A1 | 1/2004 | Wiseman et al. |
| 2004/0103281 A1 | 5/2004 | Brickell |
| 2004/0193888 A1 | 9/2004 | Wiseman et al. |
| 2004/0205341 A1 | 10/2004 | Brickell |
| 2005/0069135 A1 | 3/2005 | Brickell |
| 2005/0138384 A1 | 6/2005 | Brickell et al. |
| 2005/0138423 A1 * | 6/2005 | Ranganathan ............... 713/201 |
| 2005/0149457 A1 | 7/2005 | Cihula |

(Continued)

FOREIGN PATENT DOCUMENTS

WO WO0038089 * 6/2000

(Continued)

OTHER PUBLICATIONS

The TLS Protocol Version 1.0; Jan. 1999; RFC 2246.*

(Continued)

*Primary Examiner*—Kambiz Zand
*Assistant Examiner*—James Turchen
(74) *Attorney, Agent, or Firm*—Blakely, Sokoloff, Taylor & Zafman LLP (57) ABSTRACT

According to an embodiment of the invention, a method and apparatus for session key exchange are described. An embodiment of a method comprises requesting a service for a platform; certifying the use of the service for one or more acceptable configurations of the platform; and receiving a session key for a session of the service, the service being limited to the one or more acceptable configurations of the platform.

25 Claims, 5 Drawing Sheets

U.S. PATENT DOCUMENTS

| | | |
|---|---|---|
| 2005/0262571 A1 | 11/2005 | Zimmer et al. |
| 2006/0020785 A1 | 1/2006 | Grawrock et al. |
| 2006/0256107 A1 | 11/2006 | Scarlata et al. |
| 2007/0003064 A1 | 1/2007 | Wiseman et al. |
| 2007/0038997 A1 | 2/2007 | Grobman et al. |
| 2007/0073416 A1 | 3/2007 | Grawrock |

OTHER PUBLICATIONS

Bruce Schneier; Applied Cryptography; 1996; John Wiley & Sons, Inc.; 2nd Ed; p. 32-34.*

Sundeep Bajikar, Trusted Platform Module (TPM) based Security on Notebook PCs—White Paper, Jun. 20, 2002, Intel Corporation, Mobile Platforms Group.*

"TCG PC Specific Implementation Specification", Version 1.1,(Aug. 18, 2003),1-72.

"TCG Software Stack (TSS) Specification", Version 1.1,(Aug. 20, 2003),1-315.

"TPM Main—Part 2 TPM Structures", *Specification version 1.2 Revision 62*, (Oct. 2, 2003),1-176.

"TPM Main Part 1 Design Principles", *Specification Version 1.2—Revision 62*, (Oct. 2, 2003),1-161.

"TPM Main Part 3 Commands", *Specification Version 1.2 Revision 62*, (Oct. 2, 2003),1-269.

"Trusted Computing Group (TCG) Main Specification", Version 1.1a,(Sep. 2001),1-332.

"Trusted Computing Group Backgrounder", (May 2003),1-8.

"Trusted Computing Group TPM v1.2 Specification Changes", A summary of changes with respect to the v1.1b TPM Specification, (Oct. 2003),1-14.

* cited by examiner

SESSION KEY EXCHANGE

FIELD

An embodiment of the invention relates to secure computer operations in general, and more specifically to session key exchange.

BACKGROUND

In network operations, various methods have been used to provide security in operations. The increasingly large number of connected users results in a high degree of risk if secure operations are not maintained. For this reason, it is extremely important to provide a system that will allow the establishment of trust between various parties.

If a first agent (a client) desires a service from a second agent (a service provider), the second agent may require proof of the authority and authenticity of the first agent before providing the service. The second agent requires assurance that the first agent will not misappropriate information, attack the system, or otherwise cause damage. When such assurance is obtained, a session key may be issued, the session key providing confidentiality, integrity, or both to the services requested and rendered.

However, providing assurance of secure operations can impose a large amount of overhead on a system. Further, conventional processes may not provide sufficient security. Providing assurance of the use of a service on a particular platform or platforms may not provide assurance of the particular environment in which the service is applied.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for session key exchange.

Before describing an exemplary environment in which various embodiments of the present invention may be implemented, some terms that will be used throughout this application will briefly be defined:

As used herein, "Trusted Platform Module" or "TPM" means a device or function for use in providing secure operations. A TPM may comprises a set of functions and data that are common to all types of platforms, which must be trustworthy if the Subsystem is to be trustworthy; a logical definition in terms of protected capabilities and shielded locations. A TPM may contain platform configuration registers (PCRs), which store measurements of host system components that can be transmitted to another system in a trustworthy manner.

As used herein "public/private key pair" or "key pair" means a set of cryptographic keys used for public-key cryptography. The key pair consists of a "public key" and a "private key". The key pair may be used for encryption, in which case the public key is used for encrypting a message, and the private key used for decrypting the message. The key pair may also be used for digital signatures, in which case the private key is used for signing a message and the public key is used for verifying the message.

As used herein, a "public key" is the public half of a key pair. Among other uses, a public key may be used to encrypt a message to ensure that the message may only be decrypted by an entity holding the corresponding private key.

As used herein, a "private key" is the private or secret half of a key pair. Among other uses, a private key may be used to decrypt a message that has been encrypted with the corresponding public key.

As used herein, "session key" means a key to allow operation of a session for a system. A session key may be a randomly-generated key that is used for a single session, with a new session key provided for each session.

As used herein, "service key" means a key pair generated by a client, where the private key is stored on the client and the public key is stored by a service provider for use in connection with provision of service to a client. Service key includes a key pair used for encryption.

As used herein, "direct proof" or "direct proof protocol" means a process in which a first party and a second party establish trust by direct interaction between the parties. Direct proof includes a process in which trust is established without the use of a trusted third party.

As used herein, "platform" means an entity, including a computer, that transfers information to and from a user. As used herein, "configuration" means a manner in which a platform is set up. The terms includes a platform or a configuration as the terms are used in specifications of the TCG (Trusted Computing Group), including TCG Trusted Platform Module (TPM) specification, version 1.2, Nov. 5, 2003; the TCG Main Specification, version 1.1b, 2003; the TCG Software Stack (TSS) Specification, Version 1.1, Aug. 20, 2003; and the TCG PC Specific Implementation Specification, Version 1.1, Aug. 18, 2003.

According to an embodiment of the invention, the provision of a service to a unit may be limited to a particular environment. In one embodiment, a process is described to securely exchange a session key between a platform and a challenger so that the challenger is assured that the session key is used only in a specific environment on a specific platform.

References are made herein to the Trusted Computing Group (TCG), which is an organization formed from the Trusted Computing Platform Alliance (TCPA). In addition to TCG applications, an embodiment of this invention also applies to any technologies or specifications derived from TCPA and to other security protocols. Specifications issued by the Trusted Computing Group involving secure operations include the TCG Trusted Platform Module (TPM) specification, version 1.2, Nov. 5, 2003; the TCG Main Specification, version 1.1b, 2003; the TCG Software Stack (TSS) Specification, Version 1.1, Aug. 20, 2003; and the TCG PC Specific Implementation Specification, Version 1.1, Aug. 18, 2003.

According to an embodiment of the invention, software writing to a TCG-enabled platform, LaGrande Technology (LT) enabled platform, or similar technology is able to utilize a protocol to establish session keys for a platform. There are various established methods for exchanging session keys for a platform. However, an embodiment of the invention provides assurance that a session not only is limited to particular platform, but also to a specific configuration or configurations of the platform. Under an embodiment of the invention, even after a session key exchange is performed, the session key is not exposed unless this is done by the particular platform in a specified configuration.

Figure 1:
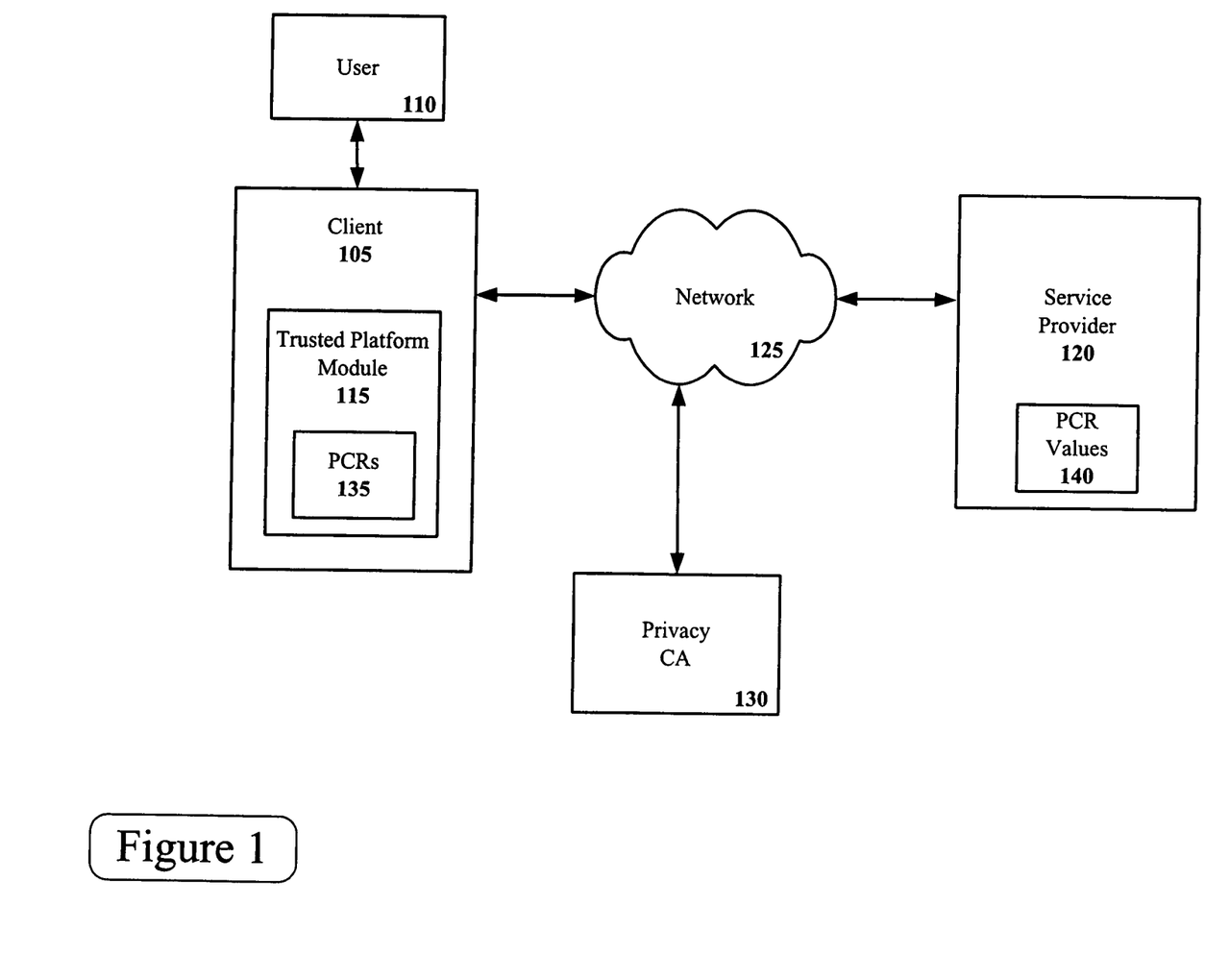
FIG. 1 illustrates an embodiment of network operations.

FIG. 1 is an illustration of an embodiment of network operations. In this illustration, a client 105 includes a user 110. The user may require a service to be provided by a service provider 120. The service may comprise the utilization of any program, computer, or system. The client 105 and the service provider 120 may be connected through a network 125, which may include the Internet. The client may include a trusted platform module (TPM) 115 for use in conducting secure transactions. The trusted platform module 115 includes a set of platform configuration registers (PCRs) 135 that contain values representing the platform's configuration. In certain embodiments, a trusted third party, such as a TCG defined privacy certification authority (CA) 130, may be used to provide a credential, such as the issuance of an attestation identification key (AIK) certificate to the client. In other embodiments, no trusted third party is utilized. The AIK or other credential is used to establish mutual trust between the parties involved in the transaction. In this illustration, the service provider 120 requires sufficient assurance of the identification of the client and the specific limited use of the service before the service is provided. The service provider 120 may maintain policies, such as combinations of platform configuration register (PCR) values 140, that describe allowable configurations for a client platform.

In one embodiment of the invention, trust is established between the first device and a second device using a trusted third party, such as a TCG defined privacy CA. In another embodiment, trust is established using a protocol between a first device and a second device with regard to a valid digital signature without the use of a trusted third party. In another embodiment, a trusted third party is used to establish trust, but a session key is provided without a challenger receiving information regarding which of multiple acceptable configurations is being utilized. Embodiments of the invention are not limited to the particular examples described herein. An embodiment of the invention can be applied in any circumstance in which a client requires a service from a provider and the provider requires assurance regarding the use of the service.

In a first embodiment of the invention, a user on a client may require a service from a service provider entity. The client selects a privacy CA that is known to be acceptable to the service provider. The client then generates a new AIK and obtains an AIK certificate from the privacy CA for use with the service provider. This process needs to be accomplished only once per service provider.

In this embodiment, the client requests an account with the service provider by sending the obtained AIK certificate to the service provider. The service provider requires a key, called a service key, on the client that can only be used when the client is in a particular configuration or in one of a set of particular configurations. The service provider has a policy that specifies what platform configurations are valid using a set of platform configuration register (PCR) values. The service provider provides the service key policy to the client and requests the client to generate a key pair with the specified set of PCR indexes and values and with specific attributes.

The client sends the request to the platform's trusted platform module (TPM). The TPM returns the public key component for the new service key, which the client returns to the service provider. The service provider at this point may not have sufficient data to trust the client to properly formulate a generate key request. However, the service provider may trust the TPM to properly report the attributes of the service key. The service provider requests the attributes of the service key using a CertifyKey function specifying the AIK sent in the original request from the client. The client sends the CertifyKey function to the TPM. The TPM computes a hash of the public component of the service key and its attributes, including the PCR indexes and values that gate or control the use of the service key. The TPM then uses the AIK to create a digital signature of the hash. The digital signature data is sent to the service provider.

The service provider validates the digital signature of the service key attributes and now may trust the TPM to restrict usage of the service key to the specified configuration or configurations. The service provider may now send any number of session keys in any number of sessions to the client using the service key. The service provider trusts that any session key will not be decrypted unless the client is in the configuration specified by the set of PCR attributes associates with the service key.

Figure 2:
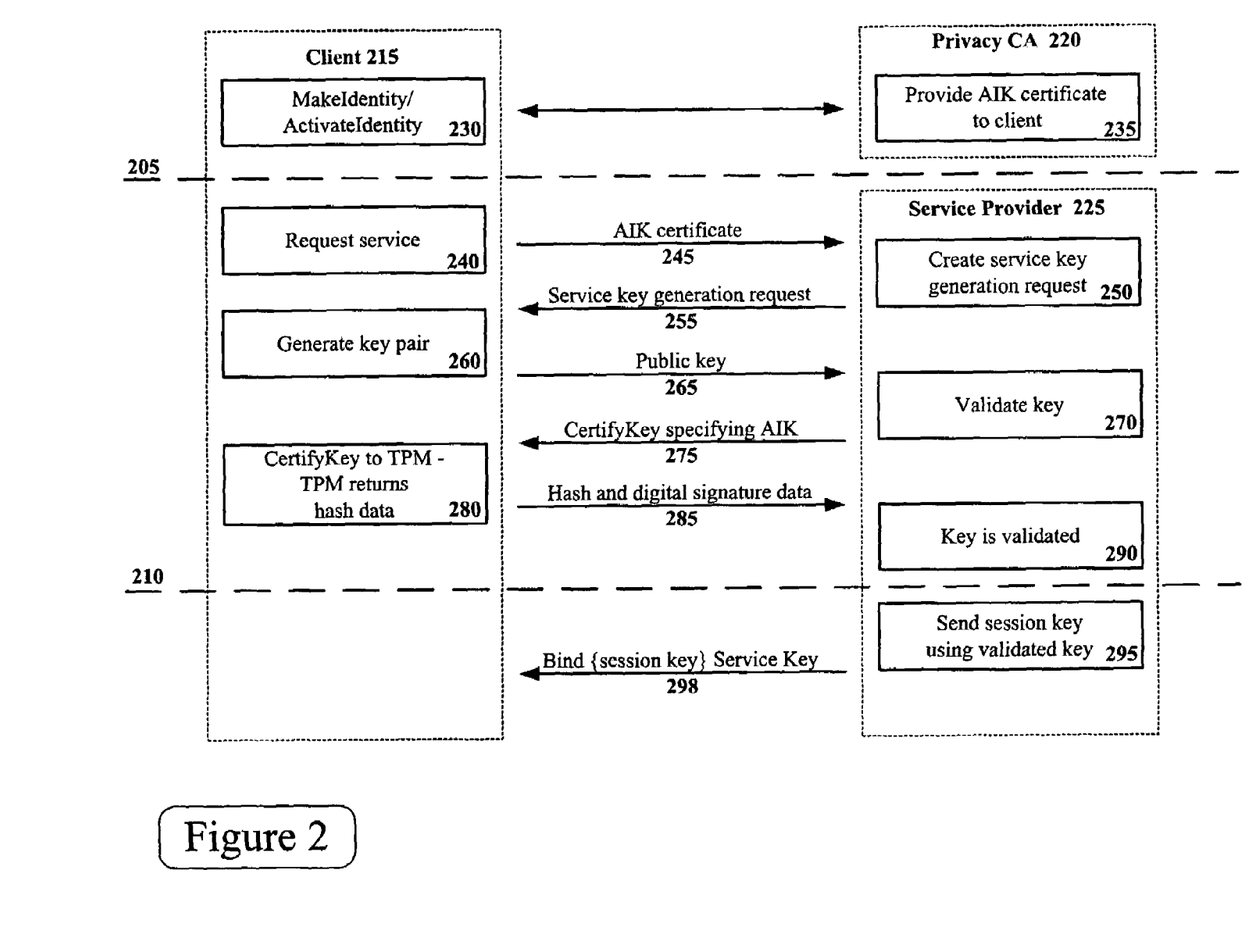
FIG. 2 illustrates an embodiment of a session key exchange utilizing a trusted third party.

FIG. 2 is an illustration of transactions between a client 215 and a service provider 225 when the client 215 requests a service from the service provider 225. The client 215 obtains an AIK certificate from a privacy CA 220. The operation of the client is shown by the commands MakeIdentity/ActivateIdentity 230. The privacy CA 220 provides the AIK certificate to the client 215.

The client makes a request for service 240 and sends the AIK certificate 245 to the service provider 225. The service provider 225 creates a new service key generation request 250, the service key being limited to specific PCR values for certain allowable configurations. The service provider 225 sends to the client 215 the service key generation request to generate a key pair 255. The client 215 then proceeds to generate the key pair 260 and returns the public key 265 to the service provider 225. The service provider 225 proceeds to validate the public key 270, including sending certify key request specifying the AIK 275 to the client 215, which in turn sends the certify key request to the TPM 280. The TPM generates a hash of the public key, associated PCR values, and relevant attributes as signed by the AIK, and the client returns the hash and digital signature data 285 to the service provider 225. The service provider 225 validates the service key 290, thereby enabling the issuance of a session key. The service provider 225 then may send a session key using the validated service key 295, initiating the session, shown as the instruction Bind {session key} using the service key 298.

For TCG operations, an encryption operation by an entity outside of a TPM is a "Bind" operation and a decryption operation within the TPM is an "Unbind" operation. The Bind operation is an encrypt operation of the session key using the public portion of the service key. Under an embodiment of the invention, the private portion of the service key cannot be used to decrypt (unbind) the session unless the platform's configuration (as represented by the appropriate set of PCRs) matches the restrictions placed on the usage of the key. This restriction is attested to by the CertifyKey operation. The service provider has confidence in the protection of the session key because it has verified that, even though the client has the private key that can decrypt the session key, the TPM will not do so unless the platform's configuration matches the configuration attested to by the CertifyKey for the service key.

Figure 3:
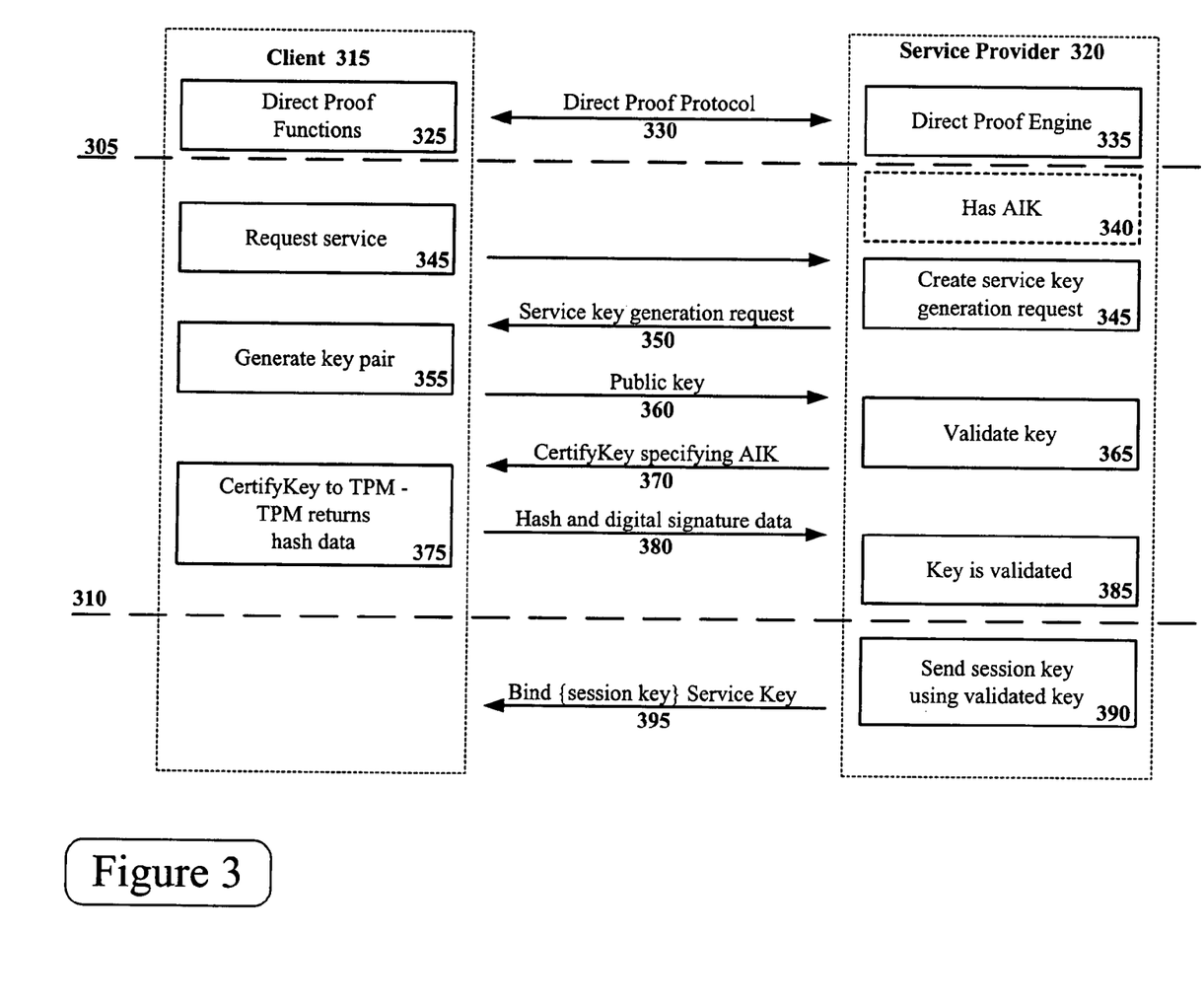
FIG. 3 illustrates an embodiment of a session key exchange utilizing a protocol to establish trust without a trusted third party.
Figure 4:
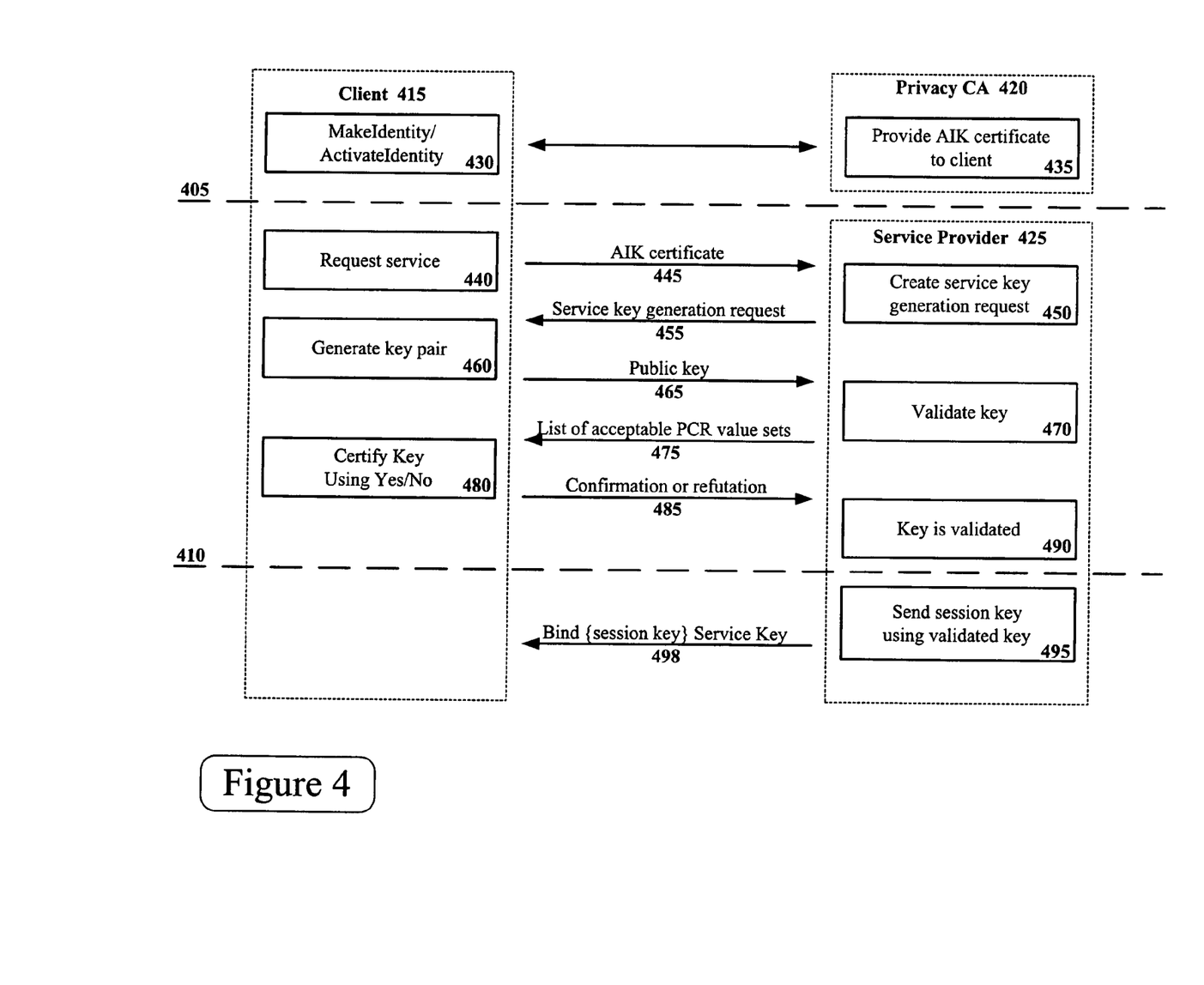
FIG. 4 illustrates an embodiment of a session key exchange without identification of the exact configuration of the client.

Under an embodiment of the invention, the processes described above and illustrated in FIG. 2, as well as the processes illustrated in FIGS. 3 and 4, can be combined without affecting the general operation of the system. For example, the generation of the key pair, returning of the public key and returning of certifying information (the hash of the public key, PCR information, and attributes, signed by the AIK) may be accomplished in a single process with a single result.

In the embodiments shown in FIG. 2, FIG. 3, and FIG. 4, the horizontal dashed lines delineate phases of a registration and use process. Components and actions illustrated above the upper dashed line (205, 305, and 405) are performed once per account setup with a particular service provider. Components and actions between the upper dashed line and the lower dashed line (210, 310, and 410) are generally accomplished once per account setup with a particular service provider, but may be repeated if necessary to reset keys (such as with a forgotten password) or, for example, for the establishment of secondary accounts under a master account. Components and actions illustrated below the lower dashed line are to be done each time a new session is needed.

In an embodiment of the invention, the establishment and proof of a key's validity is not required to be accomplished in a protected or validated environment. However, a service provider may desire to have this additional validation. Therefore, the AIK can be used (either as a separate process or combined with other processes) to prove the current state of the platform. This may be done while performing the operation either by using an AIK with a set of PCR restrictions or by performing a TCG Quote function.

According to a second embodiment of the invention, a session key exchange is performed using a method for establishing trust between a first device and a second device with regard to a valid signature without revealing identity. The method may include a direct proof protocol. In the embodiment described above, a client and a service provider agree on a Privacy CA, which may be difficult in certain circumstances. In addition, the user on the client may not want to expose the client-specific information required to establish an AIK. A direct proof protocol provides an alternative mechanism.

FIG. 3 is an illustration of a direct proof protocol embodiment. In FIG. 3, there is a transaction between a client 315 and a service provider 320, the client 315 requesting a service from the service provider 320. The client 315 engages direct proof functions 325 with the direct proof engine 335 of the service provider. Using the direct proof protocol 330, the service provider obtains an AIK for the client 340.

The client then makes a request for service 345 to the service provider 320. The service provider 320 creates a new service key generation request 348, the service key being limited to specific PCR values for certain allowable configurations. The service provider 320 sends to the client 315 the service key generation requests to generate a key pair 350. The client 315 then proceeds to generate the key pair 355 and returns the public key 360 to the service provider 320. The service provider 320 proceeds to validate the public key 365, including sending a certify key request specifying the AIK 370 to the client 315, which in turn sends the certify key request to the TPM 375. The TPM generates a hash of the public key, associated PCR values, and relevant attributes as signed by the AIK, and the client returns the hash and digital signature data 380 to the service provider 320. The service provider 320 validates the service key 385, thereby enabling the issuance of a session key. The service provider 320 then may send a session key using the validated service key 390, initiating the session, shown as the instruction Bind {session key} using the service key 395.

The first embodiment of the invention illustrated above, which utilizes a privacy CA, provides that the service provider knows the set of PCRs that are valid for a client. The provision of this information may present a privacy violation or problem because these values may be specific to one platform or a small set of individual platforms, thereby potentially identifying the platform.

According to a third embodiment of the invention, a Yes/No attestation protocol is used. The use of such a protocol allows the service provider to send certain acceptable PCR value sets to the client, which in turn sends the PCR value sets to the TPM. The service provider trusts the TPM to check the attributes of the key against the set of acceptable values sets and confirm or refute that there is at least one match with the platform. The embodiment of the invention allows a service provider to send a session key to a known, authorized and valid platform in a trusted configuration, but without identifying the particular configuration in use.

FIG. 4 illustrates a secure transaction utilizing a yes/no attestation protocol. In this illustration, transactions occur between a client 415 and a service provider 425 when the client 415 requests a service from the service provider 425. The client 415 obtains an AIK certificate from a privacy CA 420. The operation of the client is shown by the commands MakeIdentity/ActivateIdentity 430. The privacy CA 420 provides the AIK certificate to the client 415.

The client makes a request for service 440 and sends the AIK certificate 445 to the service provider 425. The service provider 425 creates a new service key generation request 450, the service key being limited to specific PCR values for certain allowable configurations. The service provider 425 sends to the client 415 the service key generation request to generate a key pair 455. The client 415 then proceeds to generate the key pair 460 and returns the public key 465 to the service provider 425. The service provider 425 proceeds to validate the public key 470. In this embodiment, the service provider sends a list of acceptable PCR value sets 475 to the client 415, which in turn sends the data to the TPM 480. The TPM certifies whether or not the list includes the particular configuration for the user by creating a digital signature with the AIK, and confirmation or refutation is sent 485 to the service provider 425. In this manner, the service provider 425 receives assurance that the platform is in an acceptable configuration, without the client 415 providing more information than is required. The service provider 425 validates the service key 490, thereby enabling the issuance of a session key. The service provider 425 then may send a session key using the validated service key 495, initiating the session, shown as the instruction Bind {session key} using the service key 498.

Figure 5:
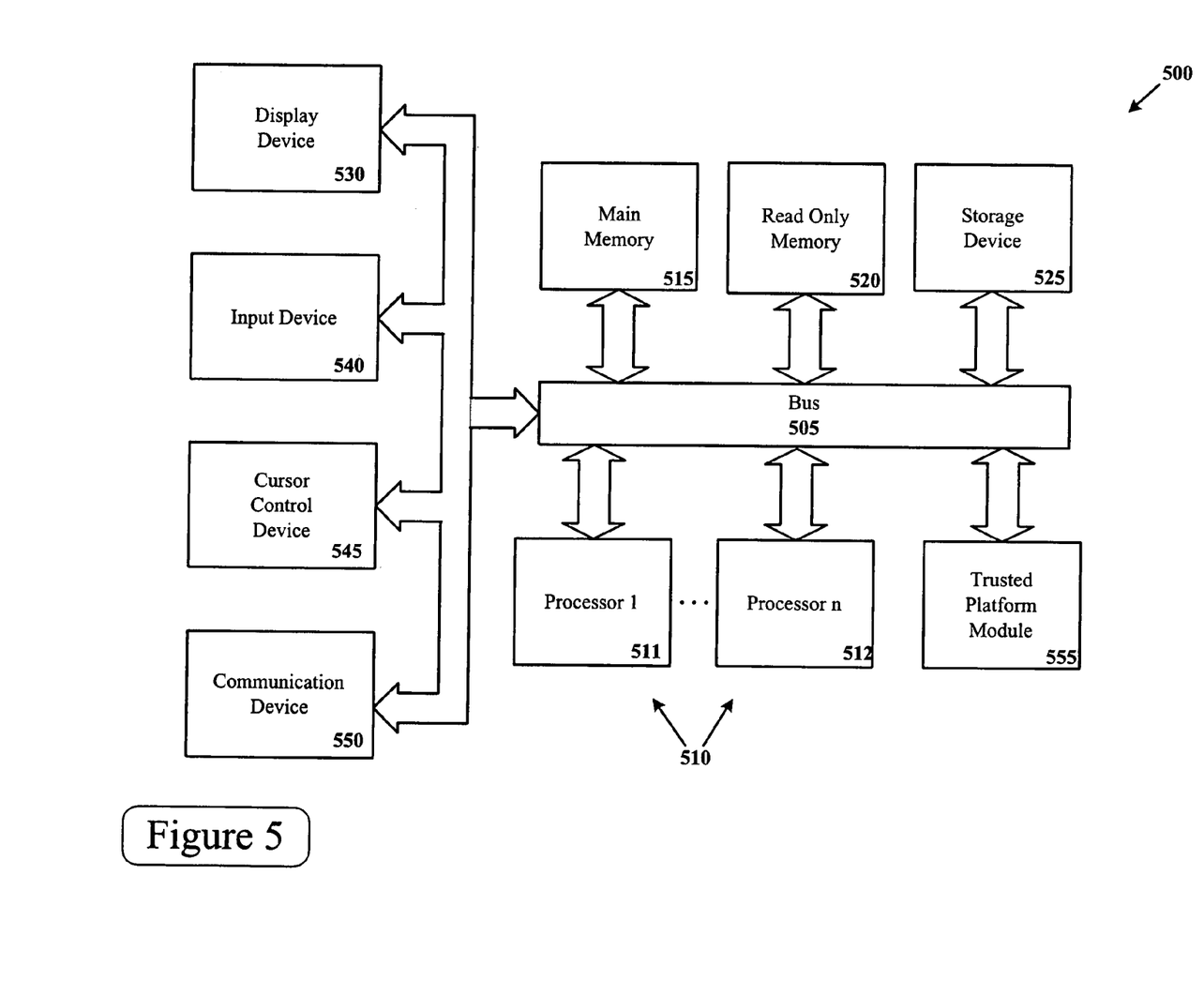
FIG. 5 illustrates an embodiment of a computer environment.

Techniques described here may be used in many different environments. FIG. 5 is block diagram of an exemplary environment. Under an embodiment of the invention, a computer 500 comprises a bus 505 or other communication means for communicating information, and a processing means such as one or more processors 510 (shown as 511 through 512) coupled with the first bus 505 for processing information.

According to an embodiment of the invention, the computer 500 includes a trusted platform module (TPM) 555. The trusted platform module is used in secure transactions, such as transactions in which the computer 500 requests a service from a service provider.

The computer 500 further comprises a random access memory (RAM) or other dynamic storage device as a main memory 515 for storing information and instructions to be executed by the processors 510. Main memory 515 also may be used for storing temporary variables or other intermediate information during execution of instructions by the processors 510. The computer 500 also may comprise a read only memory (ROM) 520 and/or other static storage device for storing static information and instructions for the processor 510.

A data storage device 525 may also be coupled to the bus 505 of the computer 500 for storing information and instructions. The data storage device 525 may include a magnetic disk or optical disc and its corresponding drive, flash memory or other nonvolatile memory, or other memory device. Such elements may be combined together or may be separate components, and utilize parts of other elements of the computer 500.

The computer 500 may also be coupled via the bus 505 to a display device 530, such as a liquid crystal display (LCD) or other display technology, for displaying information to an end user. In some environments, the display device may be a touch-screen that is also utilized as at least a part of an input device. In some environments, display device 530 may be or may include an auditory device, such as a speaker for providing auditory information. An input device 540 may be coupled to the bus 505 for communicating information and/or command selections to the processor 510. In various implementations, input device 540 may be a keyboard, a keypad, a touch-screen and stylus, a voice-activated system, or other input device, or combinations of such devices. Another type of user input device that may be included is a cursor control device 545, such as a mouse, a trackball, or cursor direction keys for communicating direction information and command selections to processor 510 and for controlling cursor movement on display device 530.

A communication device 550 may also be coupled to the bus 505. Depending upon the particular implementation, the communication device 550 may include a transceiver, a wireless modem, a network interface card, or other interface device. The computer 500 may be linked to a network or to other devices using the communication device 550, which may include links to the Internet, a local area network, or another environment. In an embodiment of the invention, the communication device 550 may provide a link to a service provider over a network.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media / machine-readable medium suitable for storing electronic instructions. Moreover, the present invention may also be downloaded as a computer program product.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:

requesting a service for a platform from a service provider;

receiving a service key request for the service from the service provider, wherein the service key is to be restricted to one or more acceptable configurations of the platform, the configuration of the platform being represented by a set of platform configuration registers, the service provider having a policy regarding which configurations are acceptable, the acceptable configurations being represented by allowable combinations of values of the platform configuration registers;

generating a service key pair that is restricted to the platform configuration register values for the one or more acceptable configurations of the platform, the service key pair including a public key and a private key, and returning the public key of the key pair to the service provider;

certifying the use of the service for the one or more acceptable configurations of the platform; and receiving a session key for a session of the service from the service provider, the session key being bound with the public key of the service key pair, wherein the private key of the service key pair may be utilized to unbind the session key only if the configuration of the platform matches the one or more acceptable configurations to which the service key is restricted.

2. The method of claim 1, further comprising obtaining an identifying credential, wherein the identifying credential is provided to the service provider.

3. The method of claim 2, wherein the identifying credential comprises an attestation identification key (AIK) certificate.

4. The method of claim 2, wherein the identifying credential is obtained from a trusted third party.

5. The method of claim 2, wherein the identifying credential is obtained through a transaction with the service provider.

6. The method of claim 1, wherein certifying the use of the service comprises includes a process selected from the group consisting of producing hash data relating to the one or more acceptable configurations; and confirming that a chosen configuration is included in a set of platform configuration register values representing the one or more acceptable configurations.

7. A method comprising:
    receiving a service request at a service provider from a client for a platform;
    creating a service key generation request for the client, wherein the service key is to be restricted to one or more acceptable configurations of the platform, the configuration of the platform being represented by a set of platform configuration registers, wherein a policy of the service provider indicates which configurations are acceptable, the acceptable configurations being represented by allowable combinations of values of the platform configuration registers;
    receiving a public key of a service key pair from the client in response to the service generation request, the service key pair including the public key and a private key, the service key pair being restricted to the platform configuration register values of the one or more acceptable configurations of the platform;
    validating the service key, validation of the service key comprising receipt of assurance that the service is used only for one or more acceptable configurations for the platform;
    binding the session key with the public key of the service key pair, wherein the private key of the service key pair may be utilized to unbind the session key only if the configuration of the platform matches the one or more acceptable configurations to which the service key is restricted; and
    providing a session key for the service to the client based on the validated service key, the service being restricted to the one or more acceptable configurations.

8. The method of claim 7, further comprising receiving an identifying credential from the client.

9. The method of claim 8, wherein the identifying credential comprises an attestation identification key (AIK) certificate.

10. The method of claim 7, wherein validating the service key comprises a process selected from the group consisting of sending a certification request to the client and receiving hash data relating to the one or more acceptable configurations; and sending a list of platform configuration register value sets for the one or more acceptable configurations to the client and receiving a confirmation that a chosen configuration is included in the list of platform configuration register value sets.

11. A client device comprising:
    a communication device to communicate with a service provider, the client device to request a service from the service provider for a platform; and
    a trusted platform module (TPM) to provide secure operations in connection with the service from the service provider;
    wherein the client device is to:
        receive a service key request for the service from the service provider, wherein the service key is to be restricted to one or more acceptable configurations of the platform, the configuration of the platform being represented by a set of platform configuration registers, the service provider having a policy regarding which configurations are acceptable, the acceptable configurations being represented by allowable combinations of values of the platform configuration registers,
        generate a service key pair that is restricted to the platform configuration register values for the one or more acceptable configurations of the platform the service key pair including a public key and a private key, and return the public key of the service key pair to the service provider,
        provide assurance to the service provider that the service is restricted to the one or more acceptable configurations for the platform, and
        receive a session key for a session of the service from the service provider, the session key being bound with the public key of the service key pair, wherein the private key of the service key pair may be utilized to unbind the session key only if the configuration of the platform matches the one or more acceptable configurations to which the service key is restricted.

12. The client device of claim 11, wherein the provision of assurance to the service provider comprises receiving a certification request from the service provider, producing hash data relating to the one or more acceptable configurations using the trusted platform module, and sending the hash data to the service provider.

13. The client device of claim 11, wherein the provision of assurance to the service provider comprises receiving a list of acceptable platform configuration register value sets relating to the one or more acceptable configurations and sending a confirmation that a chosen configuration is included in the list of acceptable platform configuration register value sets.

14. A system comprising:
    a client device, the client device comprising a trusted platform module, the client device to request a service for a platform of the client; and
    a service provider to provide a service to the client device, the service provider to receive the service request from the client and create a service key generation request for the client, wherein the service key is to be restricted to one or more acceptable configurations of the platform, the configuration of the platform being represented by a set of platform configuration registers, wherein a policy indicates which configurations are acceptable, the acceptable configurations being represented by allowable combinations of values of the platform configuration registers;
    the client device to generate a service key pair in response, the service key pair including a public key and a private key, the service key pair being restricted to the platform configuration register values of one or more acceptable configurations of the platform and to return a public key of the key pair to the service provider, certify that the service will be utilized only in one or more acceptable configurations of a platform of the client device, and receive a session key for a session of the service from the service provider, session key being bound with the public key of the service key pair, wherein the private key of the service key pair may be utilized to unbind the session key only if the configuration of the platform matches the one or more acceptable configurations to which the service key is restricted.

15. The system of claim 14, wherein the client device obtains an identifying credential.

16. The system of claim 15, wherein the identifying credential comprises an attestation identification key (AIK) certificate.

17. The system of claim 15, wherein the identifying credential is obtained from a trusted third party.

18. The system of claim 15, wherein the identifying credential is obtained through a transaction with the service provider.

19. The system of claim 14, wherein certifying the use of the service comprises a process selected from the group consisting of producing hash data relating to the one or more acceptable configurations; and confirming that a chosen configuration is included in a set of platform configuration register values representing the one or more acceptable configurations.

20. A computer-readable medium having stored thereon data representing sequences of instructions that, when executed by a processor, cause the processor to perform operations comprising:
    requesting a service for a platform from a service provider;
    receiving a service key request for the service from the service provider, where the service key is to be restricted to one or more acceptable configurations of the platform, the configuration of the platform being represented by a set of platform configuration registers, the service provider having a policy regarding which configurations are acceptable, the acceptable configurations being represented by allowable combinations of values of the platform configuration registers;
    generating a service key pair that is restricted to the platform configuration register values for the one or more acceptable configurations of the platform, the service key pair including a public key and a private key, and returning the public key of the key pair to the service provider;
    certifying the use of the service for the one or more acceptable configurations of the platform; and
    receiving a session key for a session of the service from the service provider, the session key being bound with the public key of the service key pair, wherein the private key of the service key pair may be utilized to unbind the session key only if the configuration of the platform matches the one or more acceptable configurations to which the service key is restricted.

21. The medium of claim 20, wherein certifying the use of the service comprises producing hash data relating to the one or more acceptable configurations.

22. The medium of claim 20, wherein certifying the use of the service comprises confirming that platform configuration values for a chosen configuration are included in a set of platform configuration register values representing the one or more acceptable configurations.

23. A computer-readable medium having stored thereon data representing sequences of instructions that, when executed by a processor, cause the processor to perform operations comprising:
    receiving a service request at a service provided from a client for a platform;
    creating a service key generation request for the client, wherein the service key is to be restricted to one or more acceptable configurations of the platform, the configuration of the platform being represented by a set of platform configuration registers, wherein a policy indicates which configurations are acceptable, the acceptable configurations being represented by allowable combinations of values of the platform configuration registers;
    receiving a public key of a service key pair from the client, the service key pair including the public key and a private key, the service key pair being restricted to the platform configuration register values of the one or more acceptable configurations of the platform;
    validating the service key, validation of the service key comprising receipt of assurance that the service is used only for one or more acceptable configurations;
    binding the session key with the public key of the service key pair, wherein the private key of the service key pair may be utilized to unbind the session key only if the configuration of the platform matches the one or more acceptable configurations to which the service key is restricted; and
    providing a session key for the service to client based on the validated key, the service being restricted to the one or more acceptable configurations.

24. The medium of claim 23, wherein validating the service key comprises sending a certification request to the client and receiving hash data relating to the one or more acceptable configurations.

25. The medium of claim 24, wherein validating the service key comprises sending a list of platform configuration register value sets for the one or more acceptable configurations to the client and receiving a confirmation that a chosen configuration is included in the list of platform configuration register value sets.

* * * * *